United States Patent [19]

Gladczak et al.

[11] Patent Number: 5,037,356

[45] Date of Patent: Aug. 6, 1991

[54] SPLIT SPROCKET ASSEMBLY

[75] Inventors: Robert J. Gladczak, Milwaukee; David P. Gruettner, Mequon; Edward W. Mentzer, Brookfield, all of Wis.

[73] Assignee: UCC Corporation, New Berlin, Wis.

[21] Appl. No.: 526,300

[22] Filed: May 21, 1990

[51] Int. Cl.⁵ ............................................. F16H 55/46
[52] U.S. Cl. ..................................... 474/95; 474/902; 474/903
[58] Field of Search ................................... 474/95-99, 474/30, 52, 902, 903

[56] References Cited

U.S. PATENT DOCUMENTS

| | | | |
|---|---|---|---|
| 454,227 | 6/1891 | Reitz | 474/98 |
| 488,253 | 12/1892 | Rudd | 474/99 |
| 1,223,024 | 4/1917 | Barry | 474/99 |
| 1,405,342 | 1/1922 | Shaffer | 474/96 |
| 2,465,570 | 3/1949 | Bocchino | 474/98 |
| 3,097,541 | 7/1963 | Kindig | 474/98 |
| 3,106,101 | 10/1963 | Harriman | 474/96 |

Primary Examiner—Ramon S. Britts
Assistant Examiner—Roger J. Schoeppel
Attorney, Agent, or Firm—Reinhart, Boerner, Van Deuren, Norris & Rieselbach

[57] ABSTRACT

A split power transmission element, such as a sprocket, mountable on a driven shaft. A pair of substantially identical sprocket halves each include a pair of aligned, hollow, fastener sleeves extending diagonally through the plane of the sprocket. A pair of fasteners within the sleeves join the sprocket halves to each other and clamp the sprocket onto the shaft. The diagonal orientation of the fastener sleeves permits convenient disassembly of the sprocket from an upwardly located, axially displaced position. The sprocket halves are substantially identical and can be economically molded using a single mold. A keyway insert distributes driving forces throughout the sprocket hub and increases the maximum torque capacity of the sprocket.

32 Claims, 3 Drawing Sheets

SPLIT SPROCKET ASSEMBLY

BACKGROUND OF THE INVENTION

This invention relates generally to power transmission elements, such as sprockets, for power transmission purposes and, more particularly, to split power transmission elements, that are mountable on an elongate driven shaft.

Power transmission element, such as gears, pulleys, sheaves and sprockets of various types are used in a variety of applications. In one common application found, for example, in conveyor systems used in the beverage industry, one or more sprockets are mounted on an elongate driven shaft. As the shaft rotates, the sprockets turn to advance the conveyor.

For any number of reasons, it may be necessary to remove or replace a sprocket or other such power transmission element. When conventional one-piece sprockets are used, it is necessary to expose at least one end of the shaft so that the sprockets can be removed or replaced over the exposed end. This is a complicated and cumbersome procedure that can take considerable time and require shutting down conveying operations for an extended period. Valuable production time can thus be lost.

To simplify the repair and replacement of such sprockets, various types of split sprockets have been developed. These sprockets, formed in two or more sections, can be mounted on, and removed from, a driven shaft while the shaft remains in place. Use of such split sprockets greatly simplifies the removal and replacement of the sprocket and reduces the machine "downtime" required to implement maintenance and repair. Such sprockets can be formed of various materials, such as thermoplastic as well as metals. Various means have been developed for fastening the split sprocket mating sections together and the sprocket to the driven shaft.

In one split sprocket arrangement, the sprocket sections are fastened to themselves and to the driven shaft by means of four screw fasteners oriented in planes perpendicular to the shaft. Although effective in clamping the sprocket to the shaft, this arrangement is somewhat complex and difficult to service as at least some of the fasteners are in difficult to reach locations. Furthermore, the use of four separate fasteners on each sprocket increases the likelihood that one or more fasteners will be misplaced during the servicing operation, possibly resulting in use of less than four fasteners or an unanticipated delay before the machine can be returned to service.

Another split sprocket arrangement includes two fasteners that lie parallel to the longitudinal axis of the driven shaft. Although only two fasteners are used, the orientation of the fasteners parallel to the shaft makes it difficult to reach the fasteners, particularly if the sprocket is near the machine housing or the machine frame is adjacent the shaft end. Furthermore, in such a coupling arrangement the fasteners develop no force in the direction toward the shaft and hence do not provide the clamping action that is preferred for securely mounting a sprocket to the shaft.

In view of the foregoing, it is a general object of the present invention to provide a new and improved power transmission element that is easily removed and replaced on a driven shaft.

It is a further object of the present invention to provide a new and improved power transmission element with means for providing a preferentially oriented clamping force for securely mounting the element to the driven shaft.

It is a still further object of the present invention to provide a new and improved split power transmission element that utilizes a minimum of fasteners to simplify installation and removal of the element.

It is a yet another object of the present invention to provide a new and improved split power transmission element that provides convenient access to the fasteners to further simplify installation and removal of the element.

It is a further object of the present invention to provide interlocking power transmission element body teeth for resisting shear forces and aligning the split element portions.

It is an additional further object of the present invention to provide a new and improved split power transmission element that has diagonally disposed fastener sleeves positioned to optimize clamping forces while allowing easy access for service and repair.

SUMMARY OF THE INVENTION

The invention provides a power transmission element mountable on a cylindrical shaft. The preferred power transmission element includes a pair of substantially identical element halves, each of which has a generally semi-circular configuration and includes a hub portion configured to overlie a portion of the shaft. Each of the element halves further includes a pair of substantially parallel fastener sleeves on opposite sides of the hub portion and oriented diagonally relative to the plane of the element half. The power transmission element further includes a fastener within each of the fastener sleeves for joining the element halves to each other to form a power transmission element having a center hub shaped and dimensioned to encircle the shaft.

The invention also includes as a sub unit a power transmission element half for coupling to a mating half to form a complete power transmission element mountable on a driven shaft. Each of the power transmission element halves comprises a generally semi-circular member having an outer circumference, a diametric edge and a pair of opposed faces. The power transmission element half further includes a hub portion shaped to overlie a portion of the driven shaft. The hub portion defines a central axis oriented coaxially with the longitudinal axis of the shaft when the power transmission element hub portion overlies the shaft. The power transmission element half further includes a first fastener sleeve on one side of the hub portion having a hollow interior extending diagonally through the opposed faces and lying in a plane oriented substantially parallel to the central axis of the hub and substantially perpendicularly to the diametric edge. The power transmission element half further includes a second fastener sleeve on the opposite side of the hub portion having a hollow interior oriented substantially parallel to the hollow interior of the first fastener sleeve. Each of the power transmission element halves also includes at least one set of alignment teeth matingly disposed on the power transmission element cross sectional surfaces which join the two power transmission element halves together. The alignment teeth also interlock and are angularly disposed to resist shearing forces tending to separate the sprocket halves. These alignment teeth can also be oriented to reinforce the vector clamping force applied via the fastener sleeves.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like element, and wherein:

DESCRIPTION OF THE PREFERRED EMBODIMENT

Figure 1:
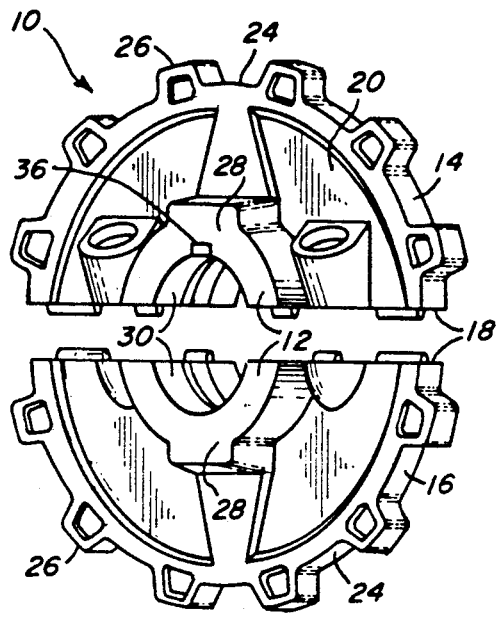
FIG. 1 is a perspective view of one embodiment of a split sprocket constructed in accordance with the invention.
Figure 2:
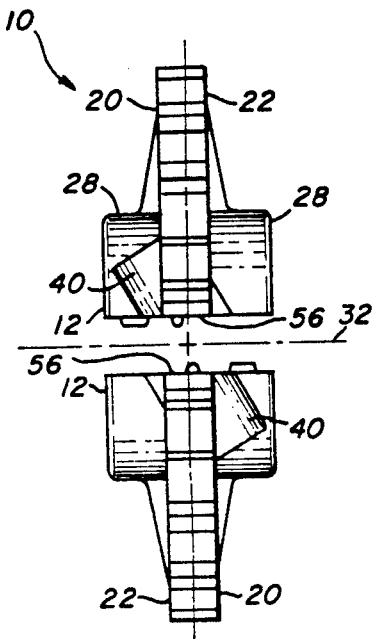
FIG. 2 is a side elevation view of the split sprocket shown in FIG. 1.

Referring to the drawings, and in particular, to FIGS. 1 and 2, a split power transmission element embodying various features of the invention is shown. In the illustrated embodiment, the split power transmission element comprises a split sprocket 10. It will be appreciated, however, that the invention is equally applicable to other forms of power transmission elements such as gears, pulleys and sheaves.

As illustrated, the split sprocket 10 comprises a generally disk-shaped member having a central hub 12 shaped and dimensioned to encircle a driven shaft such as keyed (FIG. 9) or unkeyed drive shaft (not shown). The sprocket 10 comprises a pair of substantially identical sprocket halves 14 and 16, each half having a generally semi-circular configuration. Each of the sprocket halves 14 and 16 includes a generally diametrically extending lower edge 18, a pair of opposed faces 20 and 22, and a circumferential outer edge 24 having thereon formed a plurality of sprocket teeth 26. A hub portion 28 is also formed in each of the halves 14 and 16 and is shaped to overlie a portion of the drive shaft. Each of the hub portions 28 includes a hollow interior 30 that defines a central axis 32 that is oriented coaxially with the longitudinal axis of the shaft when the hub portion 28 overlies the shaft.

Figure 9:
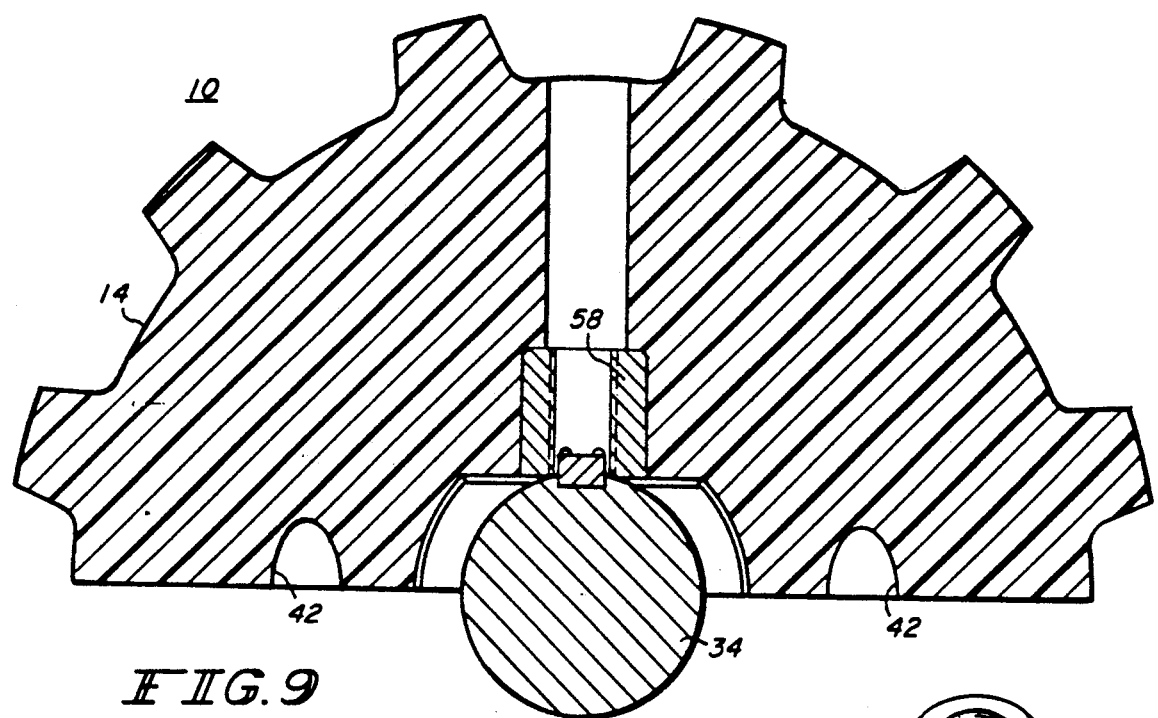
FIG. 9 is a sectional view of one embodiment of a split sprocket constructed in accordance with one aspect of the invention illustrating the use of a metallic keyway insert.
Figure 10:
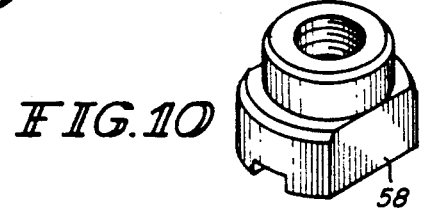
FIG. 10 is a perspective view of the metallic keyway insert shown in FIG. 9.

In the illustrated embodiment, the sprocket 10 is configured for mounting on a keyed drive shaft 34 (FIG. 9). Accordingly, one of the sprocket halves 14 includes a keyway 36 for receiving therein a drive shaft key. The other sprocket half 16, which otherwise can be identical with the first sprocket half 14, does not include the keyway 36. Preferably, both sprocket halves 14 and 16 are molded of a thermoplastic material.

Figure 3:
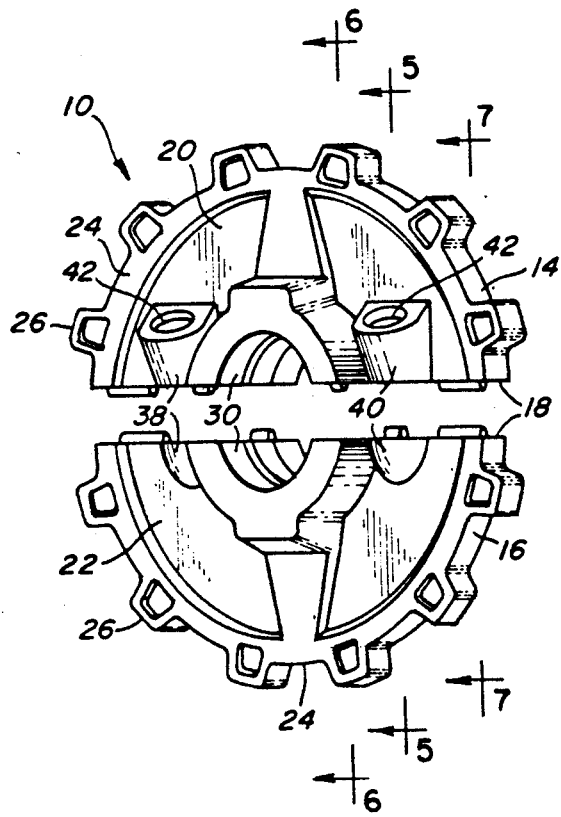
FIG. 3 is a perspective view of another embodiment of a split sprocket constructed in accordance with the invention.
Figure 4:
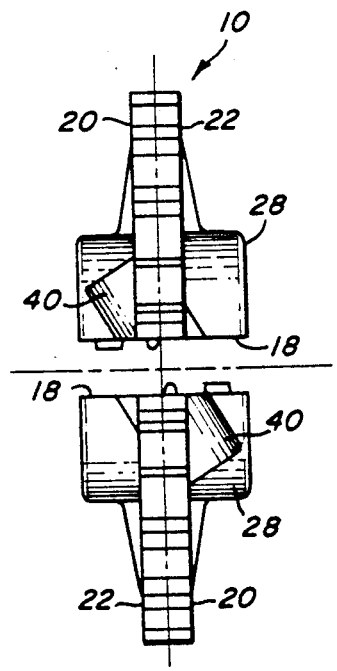
FIG. 4 is a side elevation view of the split sprocket shown in FIG. 3.

FIGS. 3 and 4 illustrate another embodiment of the split sprocket 10 wherein it is intended that the split sprocket 10 be mounted on an unkeyed shaft. In this embodiment, neither of the sprocket halves 14 or 16 includes the keyway 36. The sprocket halves 14 and 16 are identical, and the same mold can be used for forming each half.

In use, the sprocket halves 14 and 16 are placed around the drive shaft 34 and are fastened to each other to thereby lock the sprocket 10 to the shaft 34. To this end, and as shown in FIGS. 3 and 4, each sprocket half 14 and 16 includes a pair of fastener sleeves 38 and 40 located on opposite sides of the hub portions 28. The sleeves 38 and 40 extend diagonally through the disk or body portions 20, 22 of each of the sprocket halves 14 and 16. As illustrated, the sleeves 38 and 40 are hollow and are oriented so that when the diametric edges 18 and the surfaces 19 and 21 and the surfaces 19 and 21 of the sprocket halves 14 and 16 are brought together, hollow interiors 42 of the opposed sleeves 38 and 40 on opposite sides of the diametric edges 18 are substantially coaxially aligned with each other. A pair of fasteners 44, one in each pair of aligned sleeves, fasten the sprocket halves 14 and 16 to each other. Preferably, each of the fasteners 44 comprises a metallic nut 46 and bolt 48. The nut 46 preferably comprises a threaded insert, having a fluted outer surface 50 and an enlarged or flanged end 52. Preferably, each nut 46 is press fitted within the fastener sleeve 38 or 40 as shown in FIG. 5.

Figure 5:
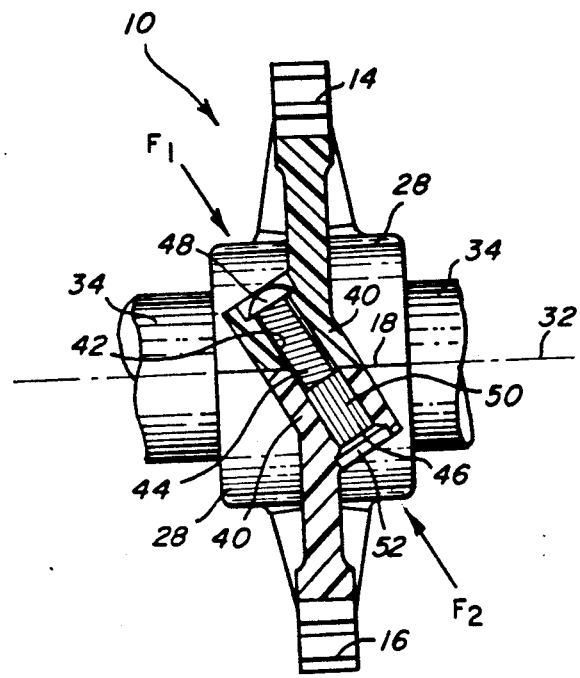
FIG. 5 is a cross-sectional view of the split sprocket shown in FIG. 3 taken along line 5—5 thereof.
Figure 8:
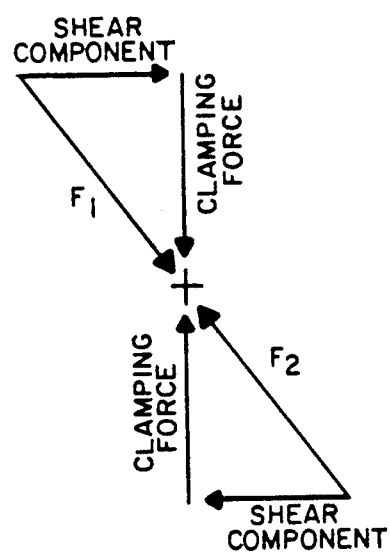
FIG. 8 is a force diagram illustrating the various forces developed in an assembled split sprocket constructed in accordance with the invention.

As illustrated in FIG. 5, each of the fastener sleeves 38 and 40 is oriented so that its hollow interior 42 lies substantially within a plane oriented parallel relative to the central axis 32 of the hub portions 28 and perpendicularly relative to the diametric edge 18. In addition, each of the fastener sleeves 38 and 40 is oriented so that central axis of its hollow interior 42 passes substantially through the midline of the diametric edge 18. When so oriented, the forces $F_1$ and $F_2$ developed by each fastener 44 include a shear component directed axially relative to the drive shaft and a clamping force directed radially relative to the drive shaft. These vector forces are illustrated in FIG. 8. The clamping forces thus developed by each of the fasteners 44 serve to clamp the sprocket 10 firmly onto the drive shaft 34.

Figure 6:
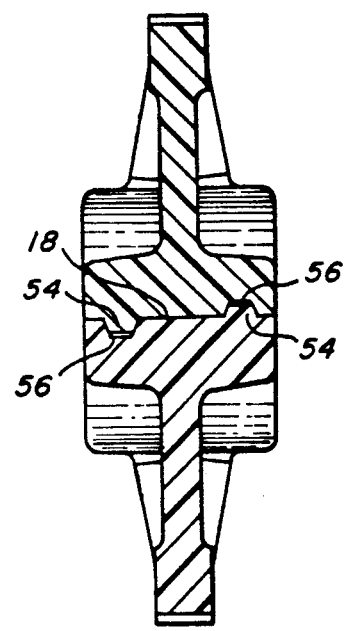
FIG. 6 is a cross-sectional view of the split sprocket shown in FIG. 3 taken along line 6—6 thereof.
Figure 7:
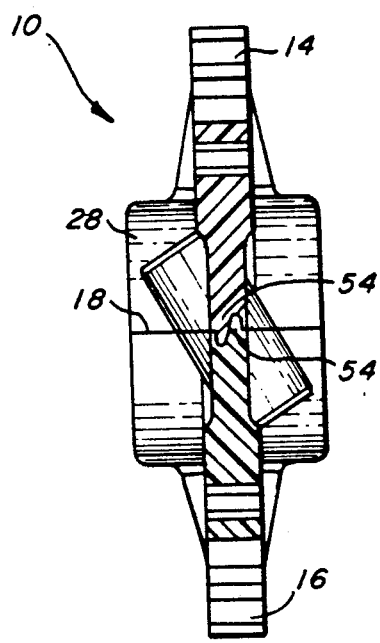
FIG. 7 is a cross-sectional view of the split sprocket shown in FIG. 3 taken along line 7—7 thereof.

As further illustrated in FIG. 8, the vector forces exerted by the fasteners 44 also develop shear force components that tend to displace the sprocket halves 14 and 16 laterally relative to each other. To overcome this shearing tendency, means are provided for preventing axial movement of the sprocket halves 14 and 16 relative to each other as the fasteners 44 are tightened. In the illustrated embodiment, such preventing means comprise a plurality of interlocking alignment teeth 54 and sockets 56 formed in the diametric edges 18 of the sprocket halves adjacent the hub portions 28 thereof. As best seen in FIGS. 6 and 7, the sides of the interlocking teeth 54 are preferably oriented at an angle of approximately 15° relative to the plane of the sprocket 10 to best resist the shearing forces developed by the fasteners 44. Preferably, the fastener sleeves 38 and 40 are oriented at substantially a 30° angle relative to the plane of the sprocket 10. These angular relationships provide good clamping forces and resistance to these forces generally while still permitting east access to the fasteners 44 for service and repair of the sprocket 10. Further details of the latter feature will be described hereinafter.

In addition to developing a substantial clamping force for securing the sprocket 10 to the drive shaft 34, another advantage of the diagonally oriented fastener sleeves 38 and 40 is that access to the head of each of the fasteners 44 can be obtained from a position above and to the side of the sprocket 10 itself. This eliminates the need to approach the sprocket 10 from underneath, and the lateral offset permits the sprocket 10 to be disassembled without interference from an overlying structure such as a conveyor belt (not shown).

To maximize the torque capacity of the sprocket 10 when the sprocket 10 is mounted on the keyed shaft 34, one of the sprocket halves 14 is preferably provided with a metallic keyway insert 58 that engages a key 60 and helps distribute the resulting driving forces to the hub 12 while avoiding deformation of the thermoplastic material forming the sprocket 10. Such a variety of keyway insert 58 is shown and described in the concurrently filed copending application of David R. Gruettner and Robert J. Gladczak entitled, "Thermoplastic Power Transmission Element Having Increased Torque Capacity," the specification of which is incorporated by reference herein.

Figure 11:
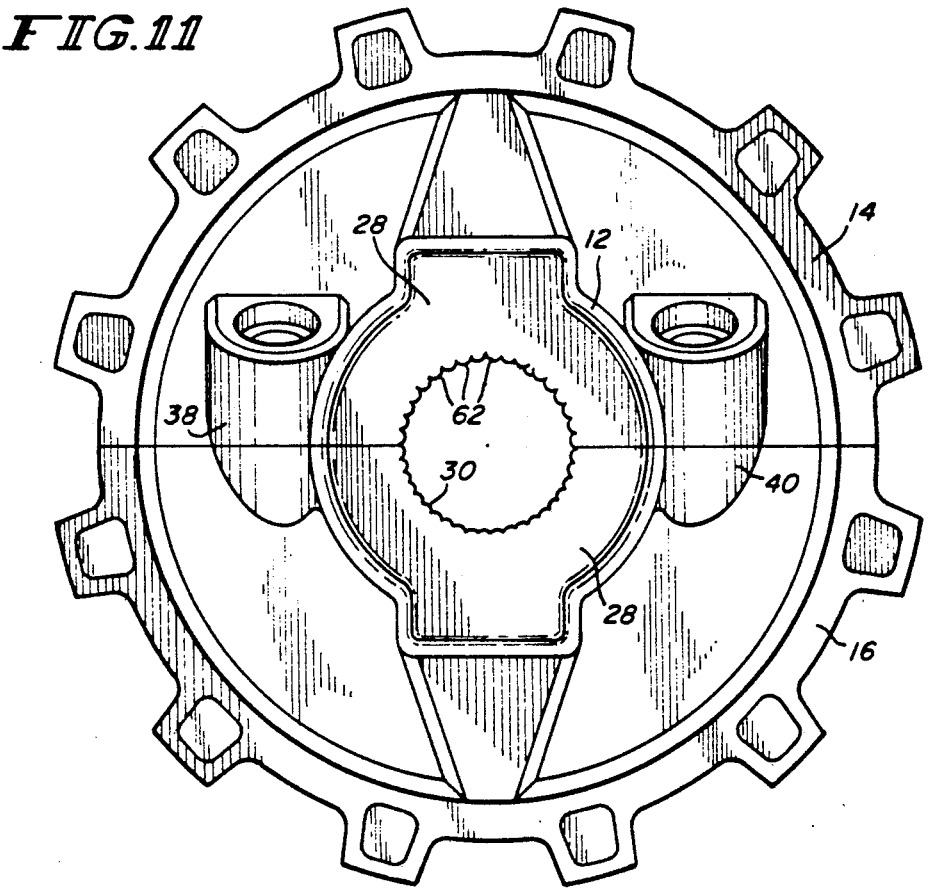
FIG. 11 is a front elevation view of another embodiment of a split sprocket constructed in accordance with the invention showing the use of a plurality of gripping pads in the hub area thereof.

Another embodiment of the invention is illustrated in FIG. 11. In this embodiment, the sprocket 10 is intended for mounting on an unkeyed shaft (not shown). To improve the torque transfer characteristics between the shaft and the sprocket 10, a plurality of integrally molded gripping pads 62 are formed along the axial bore 30 of the hub 12. These pads 62 deform under the clamping forces developed as the fasteners 44 are tightened and thus serve to grip the shaft and thereby improve the torque transfer characteristic between the shaft and the sprocket 10.

Although various embodiments of the invention have been described, it will be appreciated that various modifications can be made. For example, various fastener types other than the nuts and bolts shown and described can be employed within the fastener sleeves. Furthermore, the thermoplastic material making up the sprocket halves is not critical. Additionally, the configuration and orientation of the sprocket teeth around the sprocket circumference are also not critical. Finally, as previously noted, the invention is equally well suited for use with other forms of power transmission elements, such as gears, pulleys and sheaves.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A power transmission element mountable on a shaft, comprising:
   a pair of power transmission components, each of said power transmission element components having a generally semi-circular configuration and including a hub portion configured to overlie a portion of the shaft and further including a pair of substantially parallel fastener means on opposite sides of said hub portion oriented diagonally relative to the plane of rotation of said power transmission element component; and
   a fastener within each of said fastener means for joining said power transmission element components to each other to form a power transmission element having a central hub shaped and dimensioned to encircle the shaft.

2. A power transmission element as defined in claim 1 further comprising means for preventing axial movement of said power transmission element components relative to each other as said fasteners are tightened.

3. A power transmission element as defined in claim 2 wherein said preventing means includes teeth arranged to interlock with each other when said power transmission element components are joined to each other.

4. A power transmission element as defined in claim 3 wherein each of said power transmission element components includes a diametric edge and wherein said interlocking teeth are formed along said diametric edge.

5. A power transmission element as defined in claim 1 wherein at least one of said power transmission element components includes a keyway formed in said hub portion for receiving a key carried on the driven shaft.

6. A power transmission element as defined in claim 1 wherein each of said fastener means includes a sleeve having a hollow interior and wherein the hollow interiors of adjacent sleeves on the same side of said hub portion are substantially coaxially aligned when said power transmission element components are oriented for joining to each other.

7. A power transmission element as defined in claim 6 wherein said power transmission element includes two fasteners, each of said fasteners extending through the coaxially aligned hollow interiors of an adjacent pair of said sleeves.

8. A power transmission element as defined in claim 7 wherein each of said fasteners includes a threaded screw portion and a flanged threaded insert threadedly engaging said threaded screw portion.

9. A power transmission element as defined in claim 8 wherein said flanged threaded inserts are received within the hollow interiors of the sleeves of one of said power transmission element components.

10. A power transmission element half for a split power transmission element mountable on a drive shaft, said power transmission element half comprising:
   a generally semi-circular member having an outer circumference, a diametric edge and a pair of opposed faces;
   a hub portion formed along said diametric edge shaped to overlie a portion of the driveshaft and defining a central axis oriented coaxially with the longitudinal axis of the shaft when said hub portion overlies the driveshaft;
   a first fastener sleeve on one side of said hub portion having a hollow interior, said hollow interior extending diagonally through said opposed faces substantially in a plane oriented substantially parallel to said central axis and substantially perpendicularly to said diametric edge; and
   a second fastener sleeve on the opposite side of said hub portion having a hollow interior oriented substantially parallel to the hollow interior of said first fastener sleeve.

11. A power transmission element half as defined in claim 10 further including means for preventing axial movement of said power transmission element half relative to a similar power transmission element half when said power transmission element half is mated to the similar power transmission element half along said diametric edge.

12. A power transmission element half as defined in claim 11 wherein said preventing means comprises a plurality of tabs formed along said diametric edge, said tabs being located and shaped so as to interlock with similar tabs formed along the diametric edge of the power transmission element halves.

13. A power transmission element half as defined in claim 10 wherein said hub portion includes a keyway for engaging a key carried on the driven shaft.

14. A power transmission element half as defined in claim 10 further including an internally threaded insert within the hollow interiors of said first and second fastener sleeves.

15. A power transmission element half as defined in claim 10 wherein said power transmission element half is formed of a thermoplastic material.

16. A power transmission element half as defined in claim 12 wherein said plurality of tabs comprises a pair of interlocking alignment teeth.

17. A conveyor sprocket mountable on a shaft, comprising:
   a pair of sprocket elements, each of said sprocket elements having a generally semi-circular configuration and including a hub portion configured to overlie a portion of the shaft and further including a pair of substantially parallel fastener sleeves on opposite sides of said hub portion oriented diagonally relative to the plane of rotation of said sprocket element; and
   a fastener within each of said fastener sleeves for joining said sprocket elements to each other to form a sprocket having a central hub shaped and dimensioned to encircle the shaft.

18. A conveyor sprocket as defined in claim 17 further comprising means for preventing axial movement of said sprocket elements relative to each other as said fasteners are tightened.

19. A conveyor sprocket as defined in claim 18 wherein said preventing means includes teeth arranged to interlock with each other when said sprocket elements are joined to each other.

20. A conveyor sprocket as defined in claim 19 wherein each of said sprocket elements includes a diametric edge and wherein said interlocking teeth are formed along said diametric edge.

21. A conveyor sprocket as defined in claim 17 wherein at least one of said sprocket elements includes a keyway formed in said hub portion for receiving a key carried on the driven shaft.

22. A conveyor sprocket as defined in claim 17 wherein each of said fastener sleeves includes a hollow interior and wherein the hollow interiors of adjacent fastener sleeves on the same side of said hub portion are substantially coaxially aligned when said sprocket elements are oriented for joining to each other.

23. A conveyor sprocket as defined in claim 22 wherein said conveyor sprocket includes two fasteners, each of said fasteners extending through the coaxially aligned hollow interiors of an adjacent pair of said fastener sleeves.

24. A conveyor sprocket as defined in claim 23 wherein each of said fasteners includes a threaded screw portion and a flanged threaded insert threadedly engaging said threaded screw portion.

25. A conveyor sprocket as defined in claim 24 wherein said flanged threaded inserts are received within the hollow interiors of the fasteners sleeves of one of said sprocket halves.

26. A sprocket half for a split sprocket mountable on a drive shaft, said sprocket half comprising:
   a generally semi-circular member having an outer circumference, a diametric edge and a pair of opposed faces;
   a hub portion formed along said diametric edge shaped to overlie a portion of the driveshaft and defining a central axis oriented coaxially with the longitudinal axis of the shaft when said hub portion overlies the driveshaft;
   a first fastener sleeve on one side of said hub portion having a hollow interior, said hollow interior extending diagonally through said opposed faces substantially in a plane oriented substantially parallel to said central axis and substantially perpendicularly to said diametric edge; and
   a second fastener sleeve on the opposite side of said hub portion having a hollow interior oriented substantially parallel to the hollow interior of said first fastener sleeve.

27. A sprocket half as defined in claim 26 further including means for preventing axial movement of said sprocket half relative to a similar sprocket half when said sprocket half is mated to the similar sprocket half along said diametric edge.

28. A sprocket half as defined in claim 27 wherein said preventing means comprises a plurality of tabs formed along said diametric edge, said tabs being located and shaped so as to interlock with similar tabs formed along the diametric edge of the sprocket halves.

29. A sprocket half as defined in claim 26 wherein said hub portion includes a keyway for engaging a key carried on the driven shaft.

30. A sprocket half as defined in claim 26 further including an internally threaded insert within the hollow interiors of said first and second fastener sleeves.

31. A sprocket half as defined in claim 26 wherein said sprocket half is formed of a thermoplastic material.

32. A sprocket half as defined in claim 28 wherein said plurality of tabs comprises a pair of interlocking alignment teeth.

* * * * *

UNITED STATES PATENT AND TRADEMARK OFFICE
CERTIFICATE OF CORRECTION

PATENT NO. : 5,037,356

DATED : 08/06/91

INVENTOR(S) : Robert J. Gladczak, David R. Gruettner, Edward W. Mentzer

It is certified that error appears in the above-identified patent and that said Letters Patent is hereby corrected as shown below:

ON THE TITLE PAGE: Item [75]

Please correct inventor's name from "David P. Gruettner" to --David R. Gruettner--.

Signed and Sealed this

Ninth Day of February, 1993

*Attest:*

STEPHEN G. KUNIN

*Attesting Officer*

*Acting Commissioner of Patents and Trademarks*